(12) United States Patent
Baccouche et al.

(10) Patent No.: US 10,266,137 B2
(45) Date of Patent: Apr. 23, 2019

(54) DUAL CHAMBER CRUSH CAN WITH NANO-POROUS MATERIAL

(71) Applicant: FORD GLOBAL TECHNOLOGIES, LLC, Dearborn, MI (US)

(72) Inventors: Mohamed Ridha Baccouche, Ann Arbor, MI (US); Rahul Arora, Birmingham, MI (US); Saeed David Barbat, Novi, MI (US); Jamel E. Belwafa, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 14 days.

(21) Appl. No.: 15/647,674

(22) Filed: Jul. 12, 2017

(65) Prior Publication Data

US 2019/0016284 A1    Jan. 17, 2019

(51) Int. Cl.
*B60R 19/32* (2006.01)
*F16F 9/30* (2006.01)
*B60R 19/00* (2006.01)

(52) U.S. Cl.
CPC .............. *B60R 19/32* (2013.01); *F16F 9/30* (2013.01); *B60R 2019/007* (2013.01); *F16F 2230/0023* (2013.01)

(58) Field of Classification Search
CPC ..... F16F 9/30; F16F 2230/0023; B60R 19/32; B60R 2019/007
See application file for complete search history.

(56) References Cited

U.S. PATENT DOCUMENTS

| | | | |
|---|---|---|---|
| 6,536,818 B1 * | 3/2003 | Moss | B60R 19/26 293/102 |
| 8,091,692 B2 | 1/2012 | Deshmukh et al. | |
| 9,371,048 B2 | 6/2016 | Farooq et al. | |
| 2004/0211631 A1 * | 10/2004 | Hsu | F15B 15/222 188/284 |

FOREIGN PATENT DOCUMENTS

| | | | |
|---|---|---|---|
| CN | 207122536 U | * | 3/2018 |
| DE | 102006026447 B4 | | 8/2012 |
| KR | 100776657 B1 | * | 11/2007 |

* cited by examiner

*Primary Examiner* — Lori L Lyjak
(74) *Attorney, Agent, or Firm* — Vichit Chea; Brooks Kushman, P.C.

(57) ABSTRACT

A vehicle is provided. The vehicle may include at least one crush can, a controller and a pump. The crush can may include front and rear chambers. The controller may receive a first signal indicative of a loading condition generated at the time of an impact, and the pump may displace a nano-porous liquid in response to a second signal from the controller into at least one of the front and rear chambers of the crush can.

17 Claims, 4 Drawing Sheets

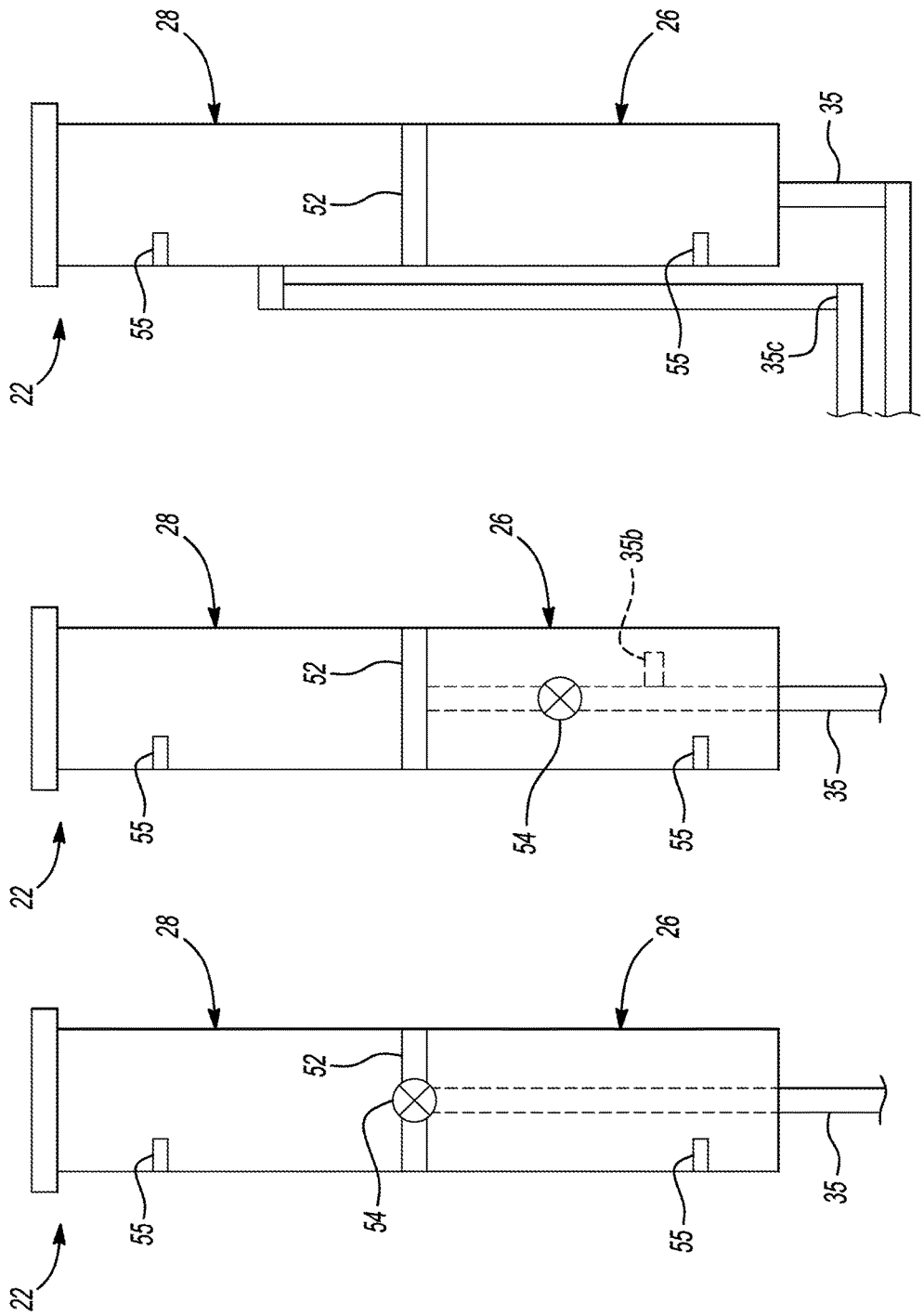

DUAL CHAMBER CRUSH CAN WITH NANO-POROUS MATERIAL

TECHNICAL FIELD

This disclosure relates to an adaptable crash management system.

BACKGROUND

Insurance ratings for a vehicle may be based, in part, on the extent of damage, ease of repair of damaged parts, and repair cost of a vehicle in low speed impact events. One such event is the 15 kph, 100° angled, 40% offset, rigid barrier impact to the rear of the vehicle. In this impact mode, damage to the frame rail, back-light panels, rear floor panel, lift-gate, or deck-lid is undesirable. All these parts are welded together in a uni-body vehicle structure. It is desirable to contain the damage caused by low speed impact events only to fascia and bumper system assemblies that can easily be unbolted from the main vehicle body and replaced after appropriate repairs.

In a conventional bumper system, the crush-can and bumper beam are designed to avoid damage to the frame rail by avoiding the transfer of high loads to the frame rail. Crush space provided by the crush-cans is intended to limit the extent of damage to front and rear vehicle structures. A mounting plate is provided to secure the crush-cans to the frame rail to limit excessive displacement that may be caused by the in-coming barrier.

SUMMARY

A vehicle includes at least one crush can, a pump, and a controller configured to, responsive to a predefined condition being present at a time of impact of the vehicle, command the pump to displace a liquid into the crush can.

A vehicle system includes a crush can having front and rear chambers, a pump connected to the crush can, and a controller. The controller is configured to, responsive to a signal indicative of a front load condition generated during an impact, power the pump to displace a material into the front chamber, and responsive to a signal indicative of a rear load condition generated during an impact, power the pump to displace the material into the rear chamber.

A vehicle system includes a crush can, and a nano-porous material, including a plurality of void pores suspended in a substrate, disposed within the crush can and configured such that, responsive to a pressure within the crush can exceeding a predetermined threshold, the void pores adsorb the substrate to increase energy absorption by the crush can.

BRIEF DESCRIPTION OF THE DRAWINGS

FIGS. 2A-2C are partial top views of the crush can assembly and associated supply arrangement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
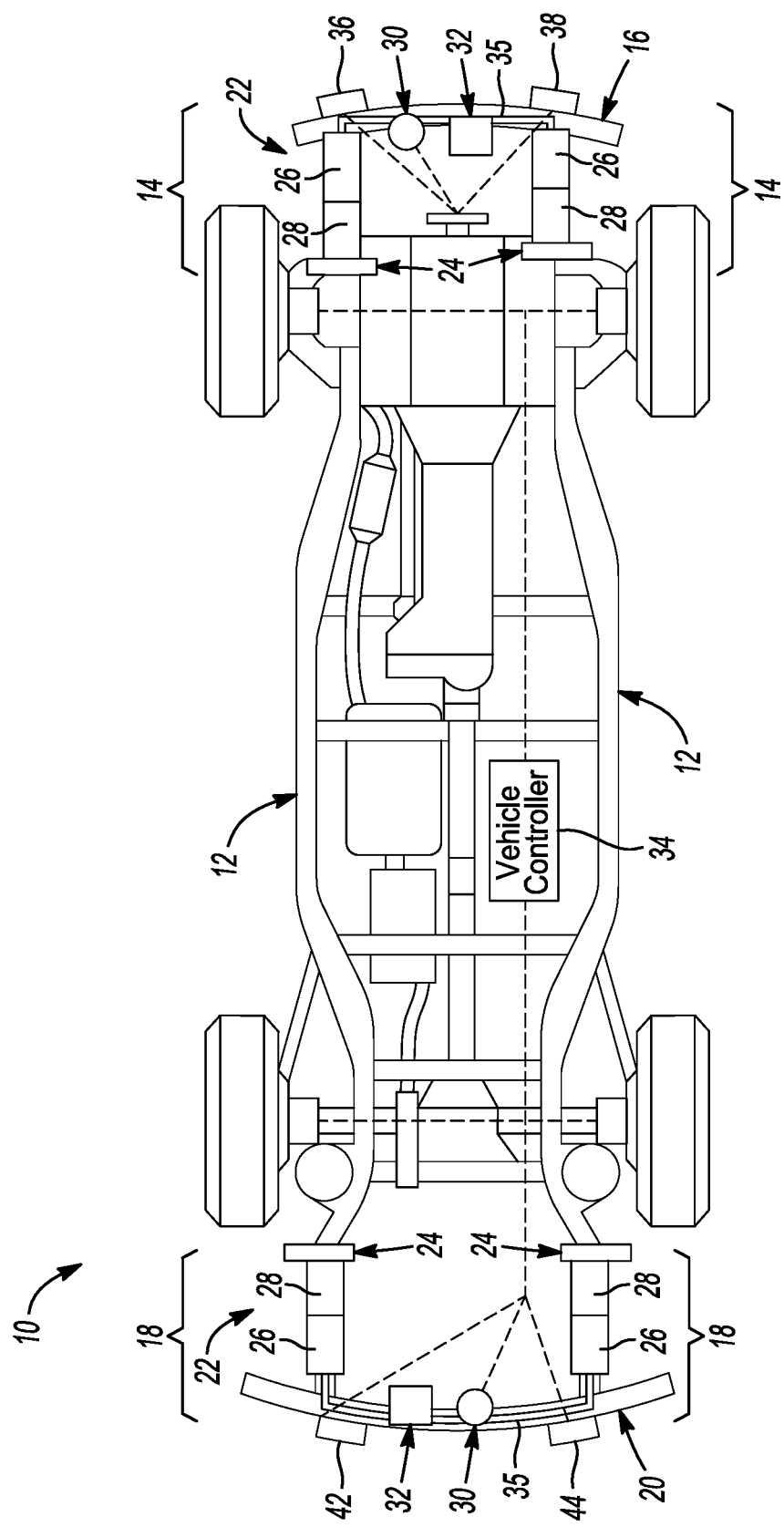
FIG. 1 is a top view of a vehicle chassis including the vehicle crash system according to one or more embodiments of this disclosure.

Referring to FIG. 1, a top view of a vehicle chassis 10 including a vehicle crash system is illustrated. The vehicle chassis includes two longitudinally extending vehicle frame rails 12 that are connected by a number of cross beams. The front of the vehicle includes a front impact absorption assembly 14 that includes a front bumper 16. The rear of the vehicle includes a rear impact absorption assembly 14 that includes a rear bumper 20.

The front absorption assembly 14 includes crush-cans 22 that are connected to the front bumper 16. The rear impact absorption assembly 18 is substantially similar to the front impact absorption assembly 14. Therefore, description of the front impact absorption assembly 14 applies to the description of the rear impact absorption assembly 18. The crush-cans 22 are attached to mounting plates 24 that are connected to vehicle frame rails 12. The crush-cans 22 include two chambers, a first chamber 26 is positioned nearest to the front bumper and the second chamber 28 is positioned nearest to the frame rails 12. As will be explained in greater detail below, the crush cans may be divided or bifurcated by an internal wall between the first chamber 26 and the second chamber 28. The crush cans 22 may be attached to the vehicle frame rails 12 by threaded fasteners or other suitable fastening means, including but not limited to, welding, structural adhesive or other methods of attachment. While two crush-cans 22 are shown disposed between the front and the rear bumpers and the frame rails 12, there may only be one crush can or more than two crush cans utilized in other embodiments.

The crush cans may be filled with a nano-porous material to increase or decrease the stiffness of the crush-cans 22. The nano-porous material may be in the form of liquid, foam, or another quasi solid phase. The nano-porous material may be disposed within either the first chamber or the second chamber, depending on the loading conditions of the vehicle. The crush cans 22 are connected to a pump or actuator 30 and a reservoir 32 by a supply line 35. The reservoir 32 may be attached to the front bumper 16 or the vehicle frame rails 12. The pump or actuator 30 is responsible for moving or controlling the nano-porous material from the reservoir 32 to the crush cans. The actuator requires a control signal and a source of energy. The control signal may be an electric voltage or current, pneumatic or hydraulic pressure. The electric voltage may be received from a battery or alternator (not shown) within the vehicle 10. If the hydraulic pressure within the supply line and reservoir is greater than a predetermined threshold, a valve may be opened to facilitate a flow of the nano-porous material from the reservoir to the crush-cans 22. While the supply lines 35 are shown connected to the first chamber 26, the supply lines 35 may be connected to the second chamber 28 or the first chamber 26 and the second chamber 28.

Figure 5:
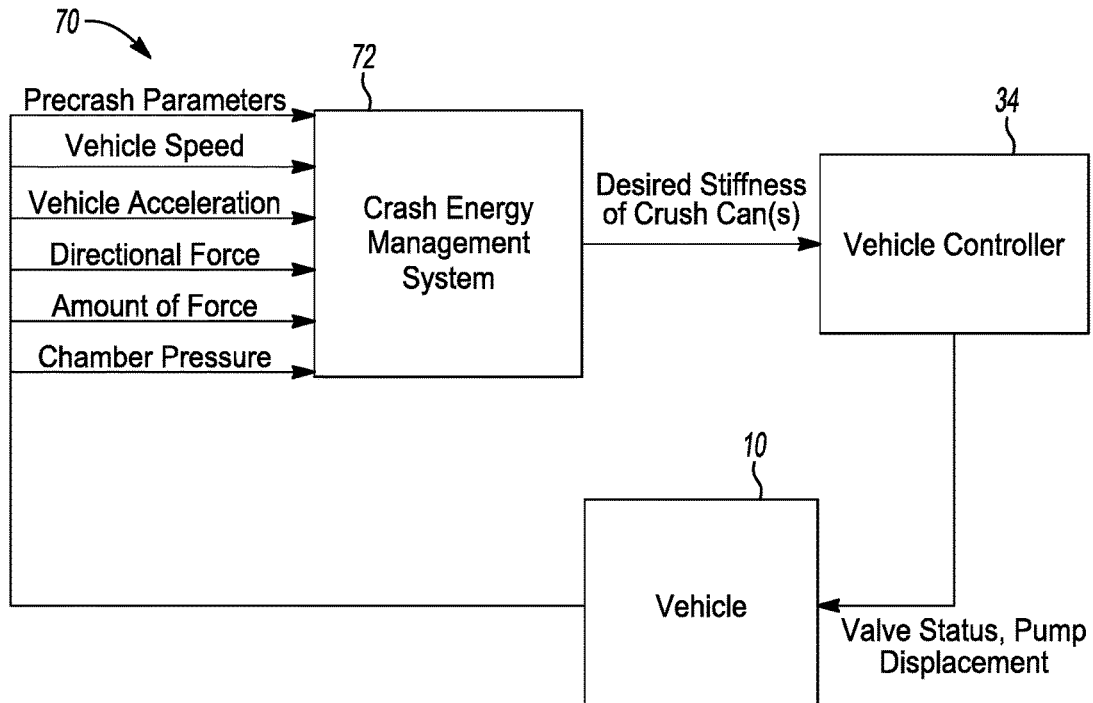
FIG. 5 is a schematic diagram of the vehicle and crash energy management system.

A number of sensors may be employed throughout the vehicle 10. Four impact sensors may be disposed between the front bumper 16 and rear bumper 20. The impact sensors may be configured to determine the amount of force or load applied to the vehicle. Additionally, the impact sensor may determine the load vector, or direction of the load applied to the vehicle. The impact sensors may electrically communicate with a controller 34 (FIG. 5). A front driver-side impact sensor 36 may be attached to the inner side of the front bumper 16 near the driver side of the vehicle 10. A front passenger-side impact sensor 38 may be attached to the inner side of the front bumper 16 near the passenger side of the vehicle 10. The front impact sensors 36 38 are configured to determine and differentiate between a partial frontal impact, either on the passenger side or the driver side of the vehicle and a full-frontal impact at or near the center of the vehicle 10.

A rear driver-side impact sensor 40 may be attached to the inner side of the rear bumper 20 near the driver side of the vehicle 10. A rear passenger-side impact sensor 42 may be attached to the inner side of the rear bumper 20 near the passenger side of the vehicle 10. Similar to the front impact sensors 36 38, the rear impact sensors 40 42 are configured to determine and differentiate between a partial rear impact, either on the passenger side or the driver side of the vehicle and a full rear impact at or near the center of the vehicle 10. The vehicle 10 may also include a number of wheel speeds sensors or vehicle velocity sensors 44. The wheel speed sensors or velocity sensors may be configured to provide the speed of the vehicle and/or the acceleration or deceleration of the vehicle during or immediately preceding the accident. The speed or velocity sensors, force sensors, acceleration sensors may provide measured data to the controller 34. The controller may compare the measured data to a predefined condition or predefined threshold, such as a speed threshold, acceleration threshold, or force threshold.

Referring to FIGS. 2A-2C partial top views of the crush-cans 22 and the supply lines for the nano-porous material are illustrated. The various illustrations shown are by way of example only. The crush cans may receive the nano-porous material by other configurations or another arrangement of the supply lines. Each crush-can assembly 22 includes two chambers 26 28 that are divided by an internal wall 52. Referring specifically to FIG. 2A, crush can 22 is connected to the supply line that is disposed within the front chamber 26 and terminates at a valve 54 that is disposed within the wall 52. The valve 54 may be passively or actively controlled. If passively controlled, the valve 54 will open in response to sufficient pressure. Meaning, after the nano-porous liquid has accumulated in the first chamber 26 and pressure within the first chamber has reached a predetermined threshold, the valve 54 will open. In other embodiments, the valve may be electrically connected to the controller (FIG. 1 and FIG. 5). The controller may be configured to open the valve after a predetermined period of time or after a measured pressure exceeds a predetermined value. The pressure within the first and second chambers 26 28 may include a pressure sensor 55 that is configured to determine the pressure within each of the chambers. Referring specifically to FIG. 2B, the supply line 35 extends within the first chamber 26 that terminates an aperture or orifice in the wall 52. The supply line 35 may include a first chamber outlet line 35b that is oriented orthogonal to the supply line 35. In response to the valve 54 being closed, the nano-porous material is prevented from entering the second chamber 28 and is maintained within the first chamber 26. Referring specifically to FIG. 2C, the crush-can 22 includes a supply line 35 that provides nano-foam to the first chamber and a second supply line 35c that provides nano-foam to the second chamber 28.

The location of the nano-porous material, whether in the front chamber 26 or rear chamber 28, or both may be altered to meet certain crash or impact conditions. For example, if a loading event has more energy concentrated at the first portion of the crash, known as a front load condition, it may be advantageous to place the nano-porous material in the first or front chamber 26. Or if the energy associated with the impact event is relatively low, it may be advantageous to fill the first or front chamber 26 with the nano-porous material. If the energy is concentrated or higher near the end of the impact condition, known as a rear load condition, it may be advantageous to only fill the rear or second chamber 28. Whether the loading event is a front load condition or a rear load condition may depend at least on part of the configuration of the vehicle frame or size and shape of the object the vehicle hits.

Figure 3A:
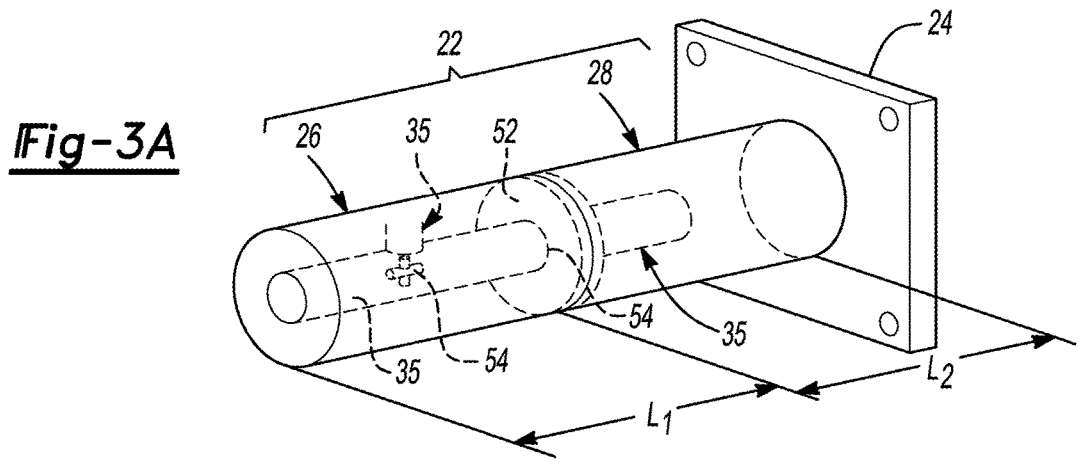
FIG. 3A is a perspective view of the crush can assembly having a circular shape.
Figure 3B:
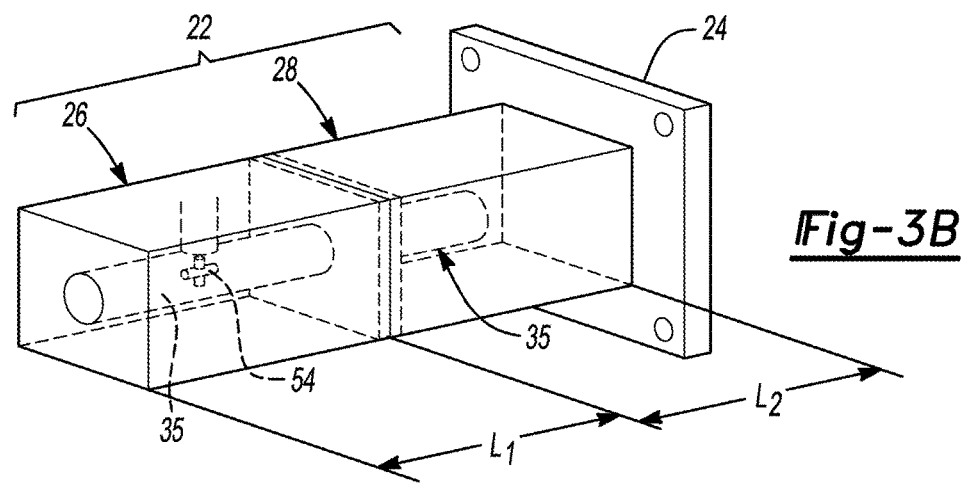
FIG. 3B is a perspective view of the crush can assembly having a rectangular shape.

Referring to FIGS. 3A-3B, perspective views illustrating some of the various shapes of the crush-cans are illustrated. The length of the first chamber 26 of the crush-can 22 may have a length L1 and the length of the second chamber 28 may have a length L2. The lengths L1 and L2 may be approximately equal to each other. But in other embodiments, L1 may be longer than L2 and vice-versa. The crush-can in FIG. 3A has a round or circular shape. The crush-can 22 of FIG. 3B may have a rectangular or square shape. The crush-can 22 may have other shapes based at least on the size of the vehicle, packaging constraints, etc.

Figure 4:
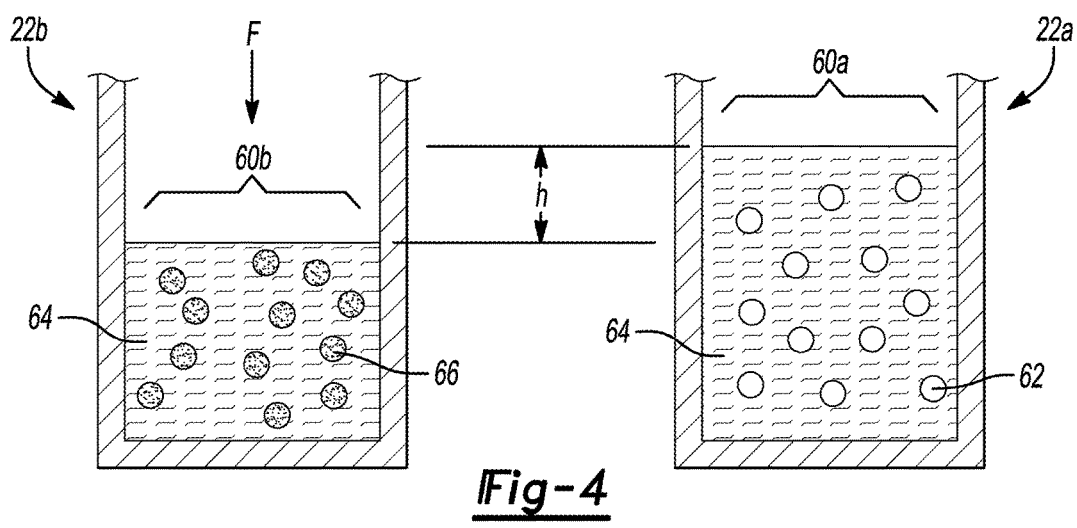
FIG. 4 is a partial cross-sectional view of an example container having a nano-porous liquid in a free state and a compressed state.
Figure 6:
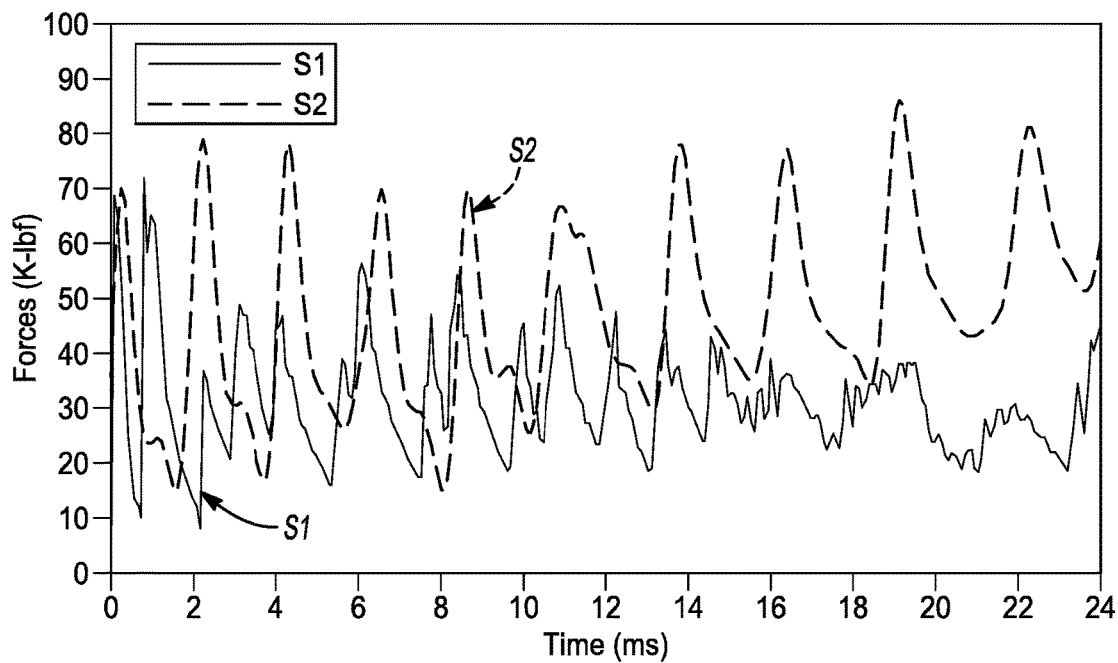
FIG. 6 is a graph illustrating an amount of pound force with respect to time absorbed by a dual chamber crush can with and without a nonporous liquid during an impact event.

Referring to FIG. 4, a partial cross-sectional view of crush cans 22a and 22b are illustrated. Crush-can 22a includes the nano-porous material 60a in an uncompressed or "free" state and crush-can 22b includes the nano-porous material 60b in a compressed or "filled" state. The nano-porous material may be comprised of silica gel or other suitable material. The nano-porous material may have a granular, vitreous, porous form of silicon dioxide made synthetically from sodium silicate. Silica gel contains a nano-porous silica micro-structure, suspended inside a liquid. The nano-porous material may be in the form of various states, including but not limited to pellets having a pore diameter ranging from 1.25 nm to 10.0 nm. The nano porous material 60a includes a number of empty pores 62 suspended in or surrounded by a free liquid phase portion 64. As a force is applied along the directional arrow F, the nano porous material is compressed by a height or distance h. When compressed the interfacial tension between the empty pores 62 and the liquid phase portion 64 is surpassed and the empty pores 62 become filled pores 66. The pores may become filled by the physical concept of adsorption. Adsorption is the adhesion of atoms, ions, or molecules from a gas, liquid, or dissolved solid to a surface. Interfacial or surface tension exists when two phases are present. These phases can be gas/oil, oil/water, or gas/water. Interfacial tension is the force that holds the surface of a particular phase together and is normally measured in dynes/cm. Interfacial surface tension is a function of pressure, temperature, and the composition of each phase. Once the interfacial surface tension has been surpassed, the filled pores become more dense and may increase the stiffness, absorb more energy, or both as compared to a crush can that is not filled with the nano-porous material (FIG. 6).

Referring to FIG. 5, an example vehicle controls 70 schematic is illustrated. The vehicle control system may include the vehicle 10 equipped with a number of sensors as outlined in FIG. 1, a vehicle controller 34 and a crash energy management system 72. While illustrated separately, the crash energy management system 72 may be part of the controller 34. The crash energy management system may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down.

The vehicle 10 and associated sensors may provide various inputs to the crash energy management system 72. Precrash parameters may include but is not limited to crash detection data collected by various sensors. The sensors may output a signal indicative of an imminent crash. The sensors may include a global positioning system (GPS), laser (LIDAR) camera that employs image recognition, and RADAR sensors, among others. Vehicle speed and/or acceleration may be determined by wheel speeds sensors, a speedometer, RADAR, LIDAR, and/or GPS sensors among others. The controller 34 may be programmed with predefined conditions or thresholds and compare the conditions and thresholds with the various inputs described above.

The directional force and the amount of force applied to the vehicle 10 may be detected by a number of sensors. As was discussed with reference to FIG. 1, the impact sensors may electrically communicate with a controller 34 to provide the load vector of the force applied during an impact event as well as the amount of load applied. Chamber pressure may also be one of the inputs for the vehicle controller 34. The chamber pressure may be determined by a number of pressure sensors disposed within or adjacent the first and second chambers of the crush-can 22 (FIG. 2A-2C). In response to the pressure of the chambers exceeding a threshold the valves 54 may be opened or closed to control the movement or displacement of the nano-porous material within each of the chambers.

While illustrated as one controller, the controller 34 may be part of a larger control system and may be controlled by various other controllers throughout the vehicle 10, such as a vehicle system controller (VSC). It should therefore be understood that the controller 34 and one or more other controllers can collectively be referred to as a "controller" that controls various actuators in response to signals from various sensors to control functions the vehicle 10 or vehicle subsystems. The controller 34 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10 or vehicle subsystems.

Control logic or functions performed by the controller 34 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 34. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 34 may be configured to receive various states or conditions of the various vehicle components illustrated in FIG. 1 via electrical signals. The electrical signals may be delivered to the controller 34 from the various components via input channels. Additionally, the electrical signals received from the various components may be indicative of a request or a command to change or alter a state of one or more of the respective components of the vehicle 10. The controller 34 includes output channels that are configured to deliver requests or commands (via electrical signals) to the various vehicle components. The controller 34 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

Referring to FIG. 6, provides the results of a high-speed frontal impact test is illustrated. Line S1 represents the dual chamber crush can without the nano-porous material. Line S2 represents the dual chamber crush-can 22 including the nano-porous material disposed within each of the chambers. The y-axis of the graph illustrates the forces associated with the simulated frontal impact test (K-lbf) and the x-axis of the graph denotes the time (ms). As can been seen from the graph line S2 and S1 closely track one another between the origin and 2 ms. However, after approximately 2 ms, the crush can filled with the nano-porous material absorbs approximately 50% more energy than the crush can without the nano-porous material.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    at least one crush can;
    a pump; and
    a controller configured to, responsive to a predefined condition being present at a time of impact of the vehicle, command the pump to displace a liquid into the crush can.

2. The vehicle of claim 1, wherein the predefined condition is a speed of the vehicle exceeding a speed threshold.

3. The vehicle of claim 1, wherein the predefined condition is a loading force exceeding a force threshold.

4. The vehicle of claim 1, wherein the predefined condition is an acceleration of the vehicle being less than an acceleration threshold.

5. The vehicle of claim 1, wherein the at least one crush can includes an internal wall that divides front and rear chambers and that defines an orifice that allows the liquid to flow between the front and rear chambers.

6. The vehicle of claim 1, wherein the liquid is silica dioxide.

7. The vehicle of claim 1, wherein the predefined condition is a loading force being less than a force threshold.

8. The vehicle of claim 1, wherein the liquid is a nano-porous liquid that has a first density before the impact and a second density greater than the first density after the impact.

9. A vehicle system comprising:
    a crush can including front and rear chambers;
    a pump connected to the crush can; and
    a controller configured to,
        responsive to a signal indicative of a front impact generated during an impact, power the pump to displace a material into the front chamber, and
        responsive to a signal indicative of a rear impact generated during an impact, power the pump to displace the material into the rear chamber.

10. The vehicle system of claim 9, wherein the signal indicative of the front impact is associated with a vehicle speed exceeding a first threshold.

11. The vehicle system of claim 10, wherein the signal indicative of the rear impact is associated with a vehicle speed being less than the first threshold.

12. The vehicle system of claim 9 further comprising a material reservoir, connected to the pump and the crush can, configured to store the material.

13. The vehicle system of claim 9, wherein the material is silica dioxide.

14. The vehicle system of claim 9, wherein the material has a first density before the impact and a second density greater than the first density after the impact.

15. A vehicle system comprising:
    a crush can; and
    a nano-porous material, including a plurality of void pores suspended in a substrate, disposed within the crush can and configured such that, responsive to a pressure within the crush can exceeding a predetermined threshold, the void pores adsorb the substrate to increase energy absorption by the crush can.

16. The vehicle system of claim 15, wherein the nano-porous material has a first density before the pressure exceeds the predetermined threshold and a second density, greater than the first density after the pressure exceeds the predetermined threshold.

17. The vehicle system of claim 15, wherein the nano-porous material is silica dioxide.

* * * * *